Dec. 9, 1952 W. HARGREAVES ET AL 2,621,225

DYNAMIC ABSORBER

Filed March 1, 1951

*INVENTORS*
WILLIAM HARGREAVES
PAUL F. BECHBERGER

BY C. R. Miranda

ATTORNEY

Patented Dec. 9, 1952

2,621,225

UNITED STATES PATENT OFFICE 2,621,225

DYNAMIC ABSORBER

William Hargreaves, Wyckoff, and Paul F. Bechberger, Tenafly, N. J., assignors to Bendix Aviation Corporation, Teterboro, N. J., a corporation of Delaware Application March 1, 1951, Serial No. 213,383

11 Claims. (Cl. 171—252)

1

This invention relates to remote indicating and/or controlling systems and more particularly to a dynamic absorber for reducing pointer oscillation due to excessive vibrations imposed on the transmitters of such systems.

In the use of remote indicating systems aboard aircraft undesirable oscillations occur in the system because of excessive vibrations. This is particularly true in the case of inductive transmitter devices which develop signals in response to the movement of a rotor with respect to a stator and which are located in the vicinity of the engine or engines whose functions are to be indicated remotely. The developed signal is usually fed to a servomotor through a second inductive device connected to an amplifier to drive the pointer of an indicating instrument. Upon rotational vibration of the inductive transmitter device the stator and rotor thereof tend to oscillate with respect to each other so as to cause spurious signals to be transmitted to the servomotor thereby causing pointer oscillations. Various attempts have been made in the past to alleviate this undesirable condition by operating the servomotor with a rate generator attached to the motor shaft. However, these attempts proved unsuccessful and pointer oscillation was still excessive.

The present invention contemplates the use of an inertia disc mounted on the casing of an inductive device, and connected with the rotor shaft through a gear train of an odd number of passes. The inertia wheel, upon movement of the casing by rotational vibration serves to maintain the rotor and stator in substantial agreement so that no spurious signal is initiated.

An object of the present invention, therefore, is to provide a novel dynamic absorber for eliminating pointer oscillation in a remote indicating system due to excessive rotational vibration of a transmitter inductive device.

Another object is to provide a novel dynamic absorber for preventing movement of the rotor of an inductive device with respect to the stator thereof when the stator is subjected to excessive rotational vibration.

A further object is to provide a novel dynamic absorber wherein a mass is connected to the rotor of an inductive device through an odd number of gear passes so as to prevent relative rotation of the rotor with respect to a stator when the inductive device is subjected to rotational vibration.

The foregoing and other objects and advantages of the present invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not to be construed as defining the limits of the invention.

In the drawing wherein like reference numerals refer to like parts,

Figure 1:
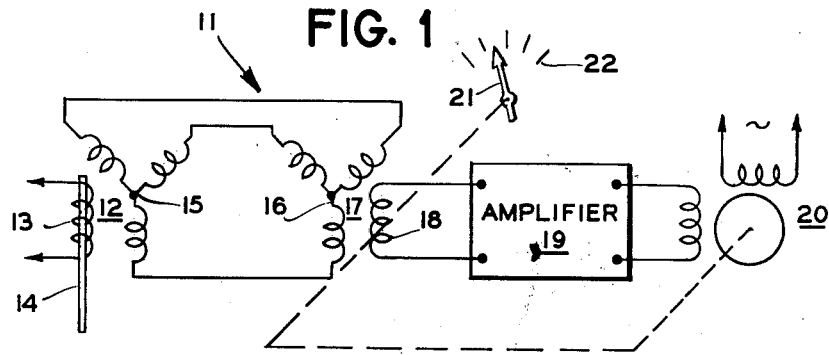
Fig. 1 is a diagrammatic illustration of a simple indicating or controlling system in which the novel dynamic absorber of the present invention may be utilized.

Referring now to the drawing for a more detailed description of the present invention and more particularly to Fig. 1 thereof, an indicator system in which the novel dynamic absorber hereof may be utilized is generally designated by the numeral 11 in Figure 1 and comprises an inductive transmitting device 12. The inductive device 12 comprises a rotor winding 13, energized by a suitable source of alternating current, and is supported for angular displacement relative to a wound stator 15 by a shaft 14. Shaft 14 and winding 13 when angularly displaced relative to stator windings 15 causes signal voltages to be developed in the stator windings, dependent upon their relative angular position relative to the rotor in a manner well known to those skilled in the art. Shaft 14 may be connected to any conventional type condition responsive means, not shown, such as a flexible pressure container subject to deflection, which effects angular displacement of the shaft and rotor winding 13 with respect to the stator windings. Connected to receive the voltages developed in stator windings 15 are the three phase stator windings 16 of an inductive receiver device 17. Inductively coupled to stator windings 16 is a single phase rotor winding 18 which develops a signal of a phase and magnitude corresponding to the direction and amount of displacement of rotor 13 from a reference position relative to stator 15. The output of rotor winding 13 is fed to a conventional amplifier 19, shown as a box, which amplifies the signal to drive a motor 20 drivably connected by suitable means such as that represented by the broken lines, to drive rotor winding 18 to a null or no-signal generating position, a pointer 21 being angularly displaced with the rotor. In this manner, rotor winding 18 is driven to a null and the pointer 21 is moved relative to a dial 22 to give an indication at one point of the condition influencing the pressure responsive means at another and remote point. The foregoing arrangement is conventional and has been included herein for a better understanding of the present invention.

Figure 2:
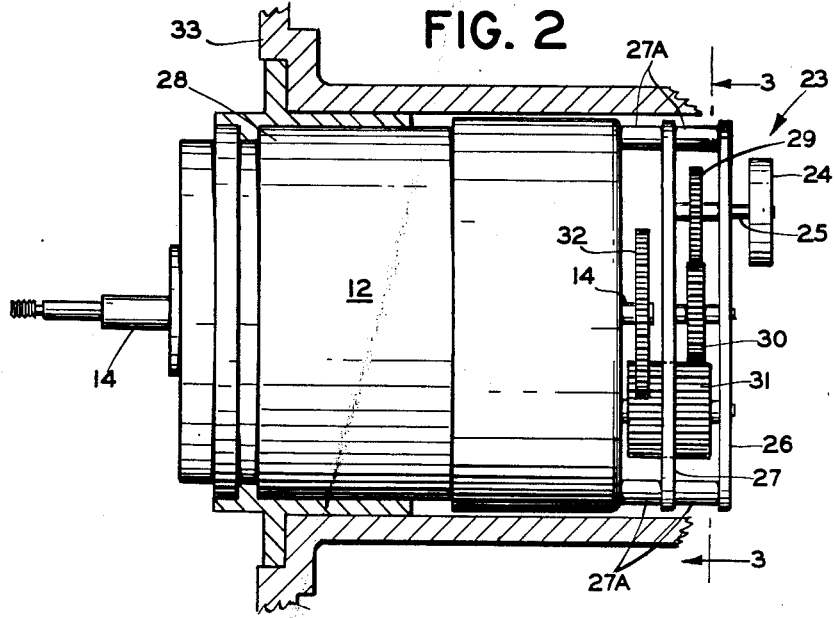
Fig. 2 is a side view of an inductive device employing the novel dynamic absorber thereof.
Figure 3:
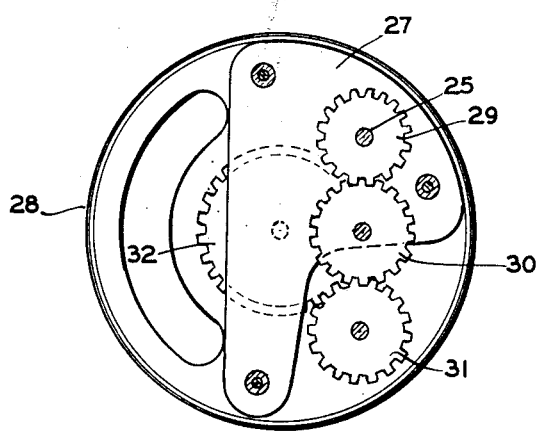
Fig. 3 is a section view taken substantially along line 3—3 of Figure 2.

The novel dynamic absorber is generally designated by the numeral 23 and shown in Fig. 2 of the drawing hereof, as comprising an inertia mass 24 in the form of an annular disc. Disc 24 is mounted on a shaft 25 which is journalled in a pair of spaced plates 26 and 27 both of which are secured to the casing 28 of the inductive transmitting device 12 by means of studs 27A. Secured to shaft 25 and between plates 26 and 27 is a driver gear 29. An idler gear 30 journalled between plates 26 and 27 is connected in driving relation with gear 29 to drive a relatively large gear 31 mounted between plate 26 and casing 28. Fixed to rotor shaft 14 of inductive transmitting device 12 and between plate 27 and casing 28 is a pinion 32 in meshing relation with large gear 31. Due to the odd number of gear passes, that is, meshing engagement between gears 29 and 30, gears 30 and 31 and gears 31 and 32, rotation of inertia disc 24 in one direction will effect rotation of rotor shaft 14 in an opposite direction (Fig. 3). Rotor shaft 14 is journalled in low friction bearings so that it engenders very little friction when rotated within the casing.

Inductive transmitting device 12 is shown in Fig. 2 as having its casing 28 secured in a panel 33 which is fixed to the craft. The longitudinal axis of casing 28 is positioned, in this illustration, parallel to the longitudinal axis of the craft.

When the casing of the inductive device 12 is subjected to rotational vibration, the casing and the stator windings, both of which are fixed with respect to each other, oscillate in forward and reverse directions. Under this condition, the rotor shaft 14, due to its balanced low friction mounting within the casing will remain stationary and the casing 28 will rotate relative thereto. Since relative movement between the stator and rotor windings occurs as a result of the rotational vibration, a spurious signal will be developed in stator windings 15 and reproduced at rotor winding 18 to drive motor 20 in a manner to effect undesirable oscillation of pointer 21.

The novel dynamic absorber of the instant invention eliminates this undesirable effect in the following manner: As casing 28 oscillates, the inertia disc 24 tends to rotate relative to the casing and the inertia thereof produces a rotative force or torque tending to drive rotor shaft 14 through the intermediate gearing arrangement. However, since the rotor is journalled in low friction bearings the inertia of the rotor, due to the oscillation of casing 28, also produces a force or torque with respect to the gearing arrangement. The disc 24 is so designed that the torque produced thereby is equal to the torque produced by rotor 14. Since the torques are equal and the gearing arrangement is such as to rotate inertia disc 24 and rotor 14 in opposite directions, the torques may be cancelled and the disc and rotor will remain fixed with respect to casing 28. Driver gear 29 will now remain stationary inasmuch as inertia disc 24 is stationary with respect to the casing and will not effect any driving of the remaining gears. Thus, it may be readily understood that rotor shaft 14 will not be angularly displaced relative to stator windings 15 but will move constantly with the casing 28 to eliminate relative rotation therebetween due to rotational vibration. In effect, inertia disc 24 serves to dampen oscillations of the rotor winding 13 with respect to stator winding 15 and thus eliminate pointer oscillation by preventing spurious signals from arising.

The instant invention thus provides a novel and simple dynamic absorber for preventing pointer oscillation in remote indicating systems in which the transmitter is subject to excessive vibrations. The present invention has been illustrated herein as employing a gear train having three gear passes, but it is to be understood that any number of gear passes may be used as long as the number is odd, so that rotation of a rotor shaft will be effected in a direction opposite to the direction of rotation of the inertia disc.

There may be cases wherein a slight movement between the stator and rotor is desired when the device is subjected to rotational vibration. This may be accomplished by the novel dynamic absorber by designing the inertia disc 24 in such a manner that it exerts a torque substantially equal to the torque exerted by the rotor. Since the torques will not be entirely cancelled, the rotor will be moved a very small angular distance with respect to the stator.

Although one embodiment of the invention has been illustrated in detail, it is to be expressly understood that the invention is not limited thereto. Various changes may be made in the design and arrangement of the parts without departing from the spirit and scope of the invention as will now be understood by those skilled in the art.

We claim:

1. Means for eliminating spurious signals in an inductive device having a relatively fixed stator and displaceable rotor which tends to produce a torque when the inductive device is subjected to rotational vibrations, comprising a mass supported for movement with said inductive device to produce a torque equal to said torque produced by said rotor, and means connected between said mass and said rotor for balancing said torques so that the rotor remains stationary with respect to the stator of said inductive device.

2. Means for eliminating spurious signals in a device having a relatively fixed stator and a displaceable rotor which tends to produce a torque when the device is subjected to rotational vibration, comprising a mass mounted for movement with said stator, said mass being adapted to produce a torque in response to said vibration, and means connected for movement with the stator when the latter is subjected to rotational vibrations, said means being disposed with respect to said mass and said rotor whereby the vibration produced torques exerted by said mass and said rotor oppose each other so that the rotor remains substantially aligned with said stator.

3. Means for eliminating spurious signals in an inductive device having a stator and a rotor which tends to produce a torque when the inductive device is subjected to rotational vibrations, comprising a disc mounted for movement with said inductive device, said disc being adapted to produce a torque in response to said vibrations equal to the vibration produced torque exerted by said rotor, and transmission means connected to displace said disc and said rotor in opposite directions when actuated, whereby the torques produced by said disc and said rotor are cancelled by said transmission means so that the rotor is maintained stationary with respect to the stator when said inductive device is subjected to rotational vibrations.

4. A dynamic absorber for damping the oscillations of the rotor of an inductive device subjected to rotational vibrations, comprising a weighted disc mounted for movement with said inductive device and adapted to produce a torque when said inductive device is subjected to rotational vibrations, and a gearing arrangement connected between said disc and said rotor to cause the torque produced by said disc and a torque exerted by said rotor when said inductive device is oscillated, to oppose each other, so that the rotor and disc remain stationary with respect to the inductive device.

5. A dynamic absorber for eliminating spurious signals in an inductive device having a relatively fixed stator and a movable rotor subjected to rotational vibrations, comprising an inertia disc mounted for movement with said stator, and a gear train of an odd number of gear passes connected between said inertia disc and said rotor, whereby the torques produced by said inertia disc and said rotor upon oscillation of the inductive device by rotational vibrations are cancelled to maintain the rotor aligned with said stator.

6. A dynamic absorber of the type set forth in claim 5 wherein the gear train consists of three gear passes.

7. The combination with a two-part signal developing device having one part fixed and the other displaceable relative thereto, the fixed part being subjected to vibration, of movable means subjected to the vibration of said fixed part, and means interconnecting said last named means and the displaceable part in opposition whereby relative motion between said parts due to vibration is eliminated.

8. The combination with a two-part signal developing device having one part fixed and the other displaceable relative thereto, the fixed part being subjected to rotational vibration of a rotatably mounted weighted mass subjected to the same vibration as that affecting said fixed part, and means interconnecting said mass and the displaceable part in opposition whereby relative motion between said parts due to vibration is eliminated.

9. A signal generator having a relatively movable rotor and stator, and means for eliminating spurious signals when the generator is subjected to vibrations, said means comprising a movable mass subjected to said vibrations and connected to said rotor to oppose movement of said rotor relative to said stator as a result of said vibrations.

10. In a signal generator having a relatively movable rotor and stator, means for eliminating spurious signals when the generator is subjected to vibrations, said means comprising a movable mass subjected to said vibrations, and means connecting said mass and said rotor in opposition so that movement of said rotor relative to said stator as a result of said vibrations is restrained by said mass.

11. In a signal generator having a relatively rotatable rotor and stator, means for eliminating spurious signals when the generator is subjected to vibrations comprising a rotatable mass subjected to said vibrations, and a gearing arrangement connecting said mass and said rotor in opposition so that movement of said rotor relative to said stator as a result of said vibrations is restrained by said mass.

WILLIAM HARGREAVES.
PAUL F. BECHBERGER.

No references cited.